Figure 1:
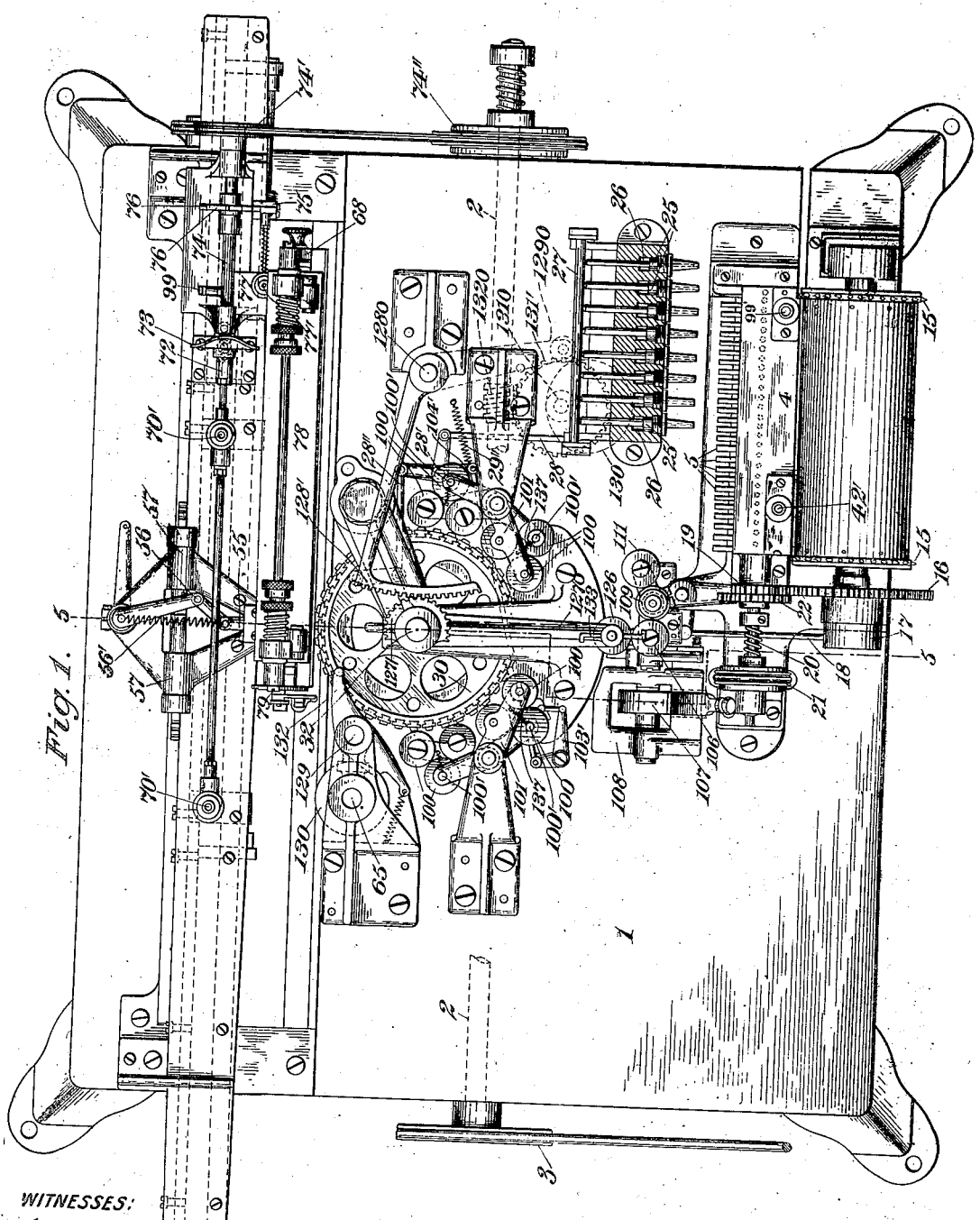

G. R. CORNWALL.
AUTOMATIC TYPOGRAPHIC APPARATUS.
APPLICATION FILED APR. 2, 1902. RENEWED SEPT. 28, 1914.

1,115,473.

Patented Oct. 27, 1914.

15 SHEETS—SHEET 2.

G. R. CORNWALL.
AUTOMATIC TYPOGRAPHIC APPARATUS.
APPLICATION FILED APR. 2, 1902. RENEWED SEPT. 28, 1914.
1,115,473.
Patented Oct. 27, 1914.
15 SHEETS—SHEET 3.
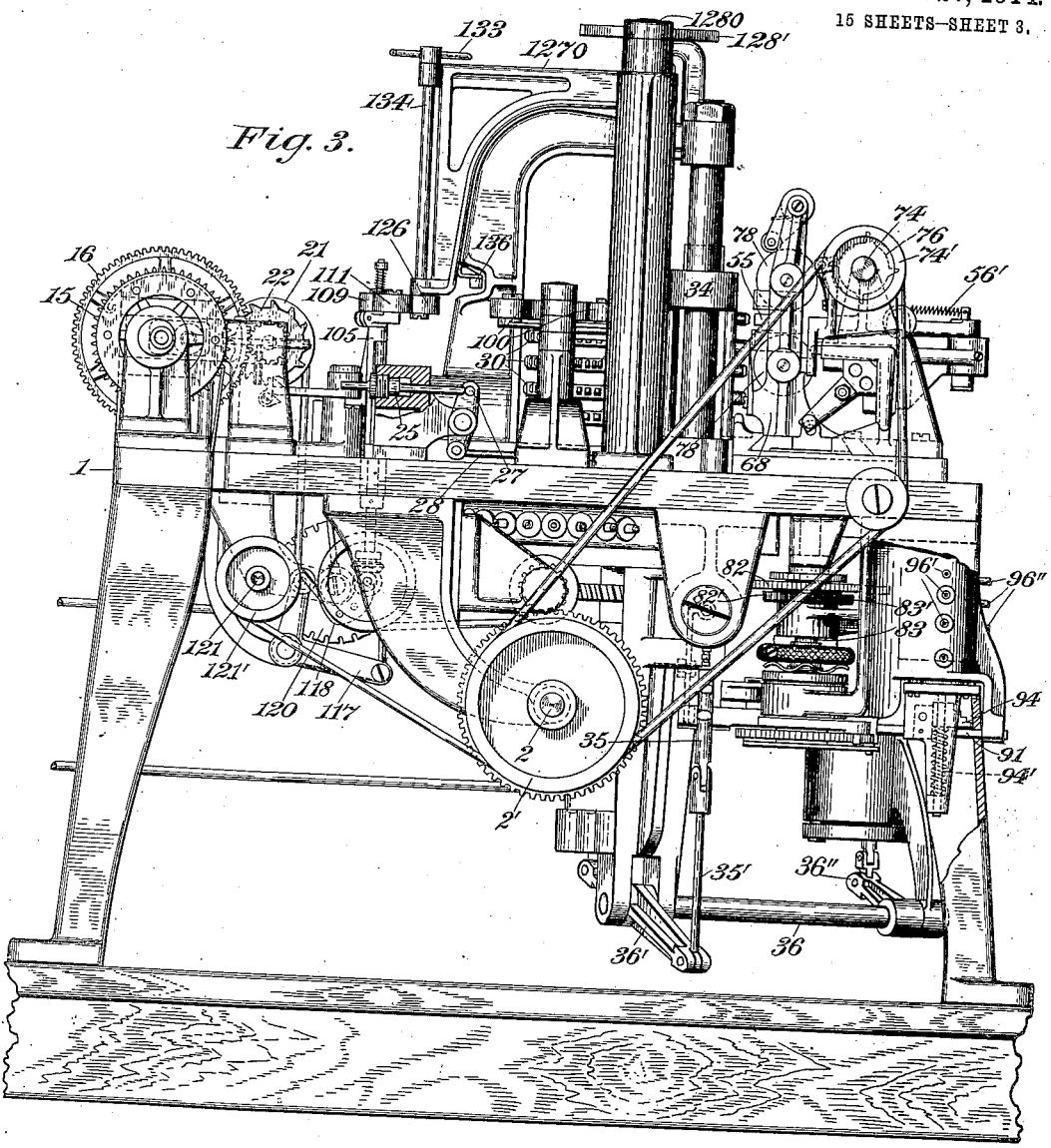
Fig. 3.
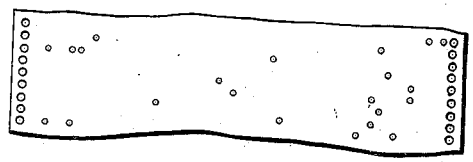
Fig. 3.ᵃ
WITNESSES:
INVENTOR
George R. Cornwall
BY
ATTORNEYS G. R. CORNWALL.
AUTOMATIC TYPOGRAPHIC APPARATUS.
APPLICATION FILED APR. 2, 1902. RENEWED SEPT. 28, 1914.

1,115,473.

Patented Oct. 27, 1914.
15 SHEETS—SHEET 4.

WITNESSES:

INVENTOR
George R. Cornwall
BY
ATTORNEYS

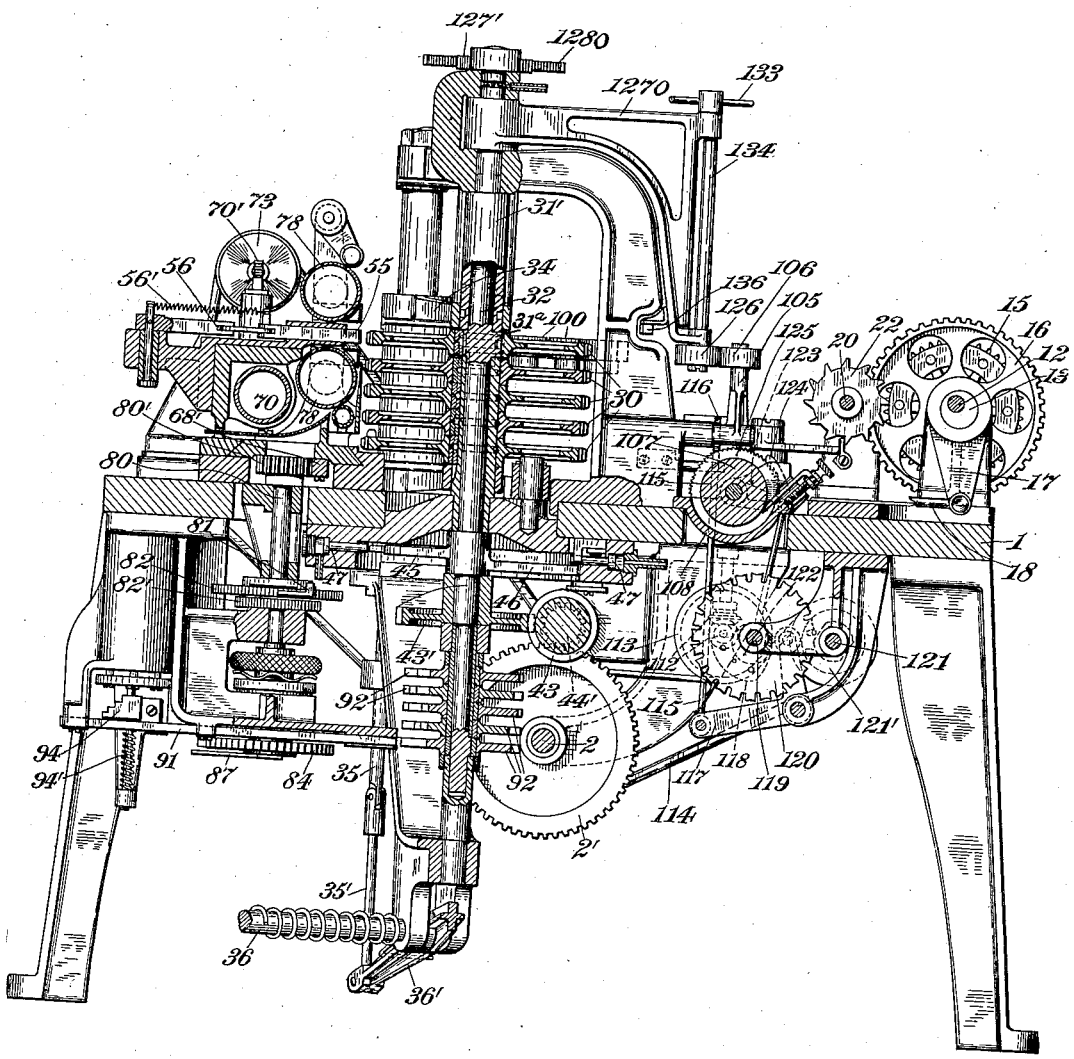

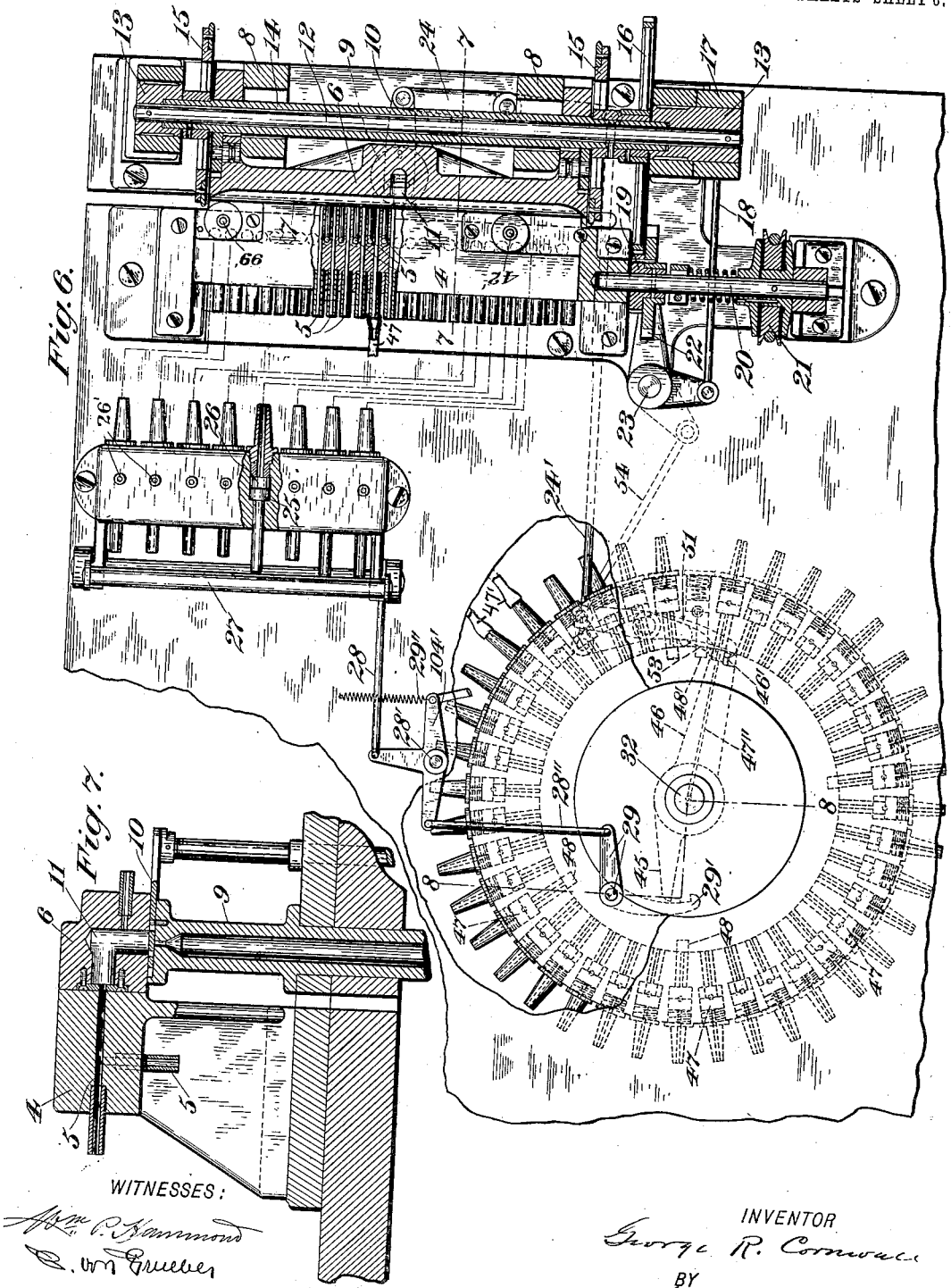

G. R. CORNWALL.
AUTOMATIC TYPOGRAPHIC APPARATUS.
APPLICATION FILED APR. 2, 1902. RENEWED SEPT. 28, 1914.
1,115,473.
Patented Oct. 27, 1914.
15 SHEETS—SHEET 7.
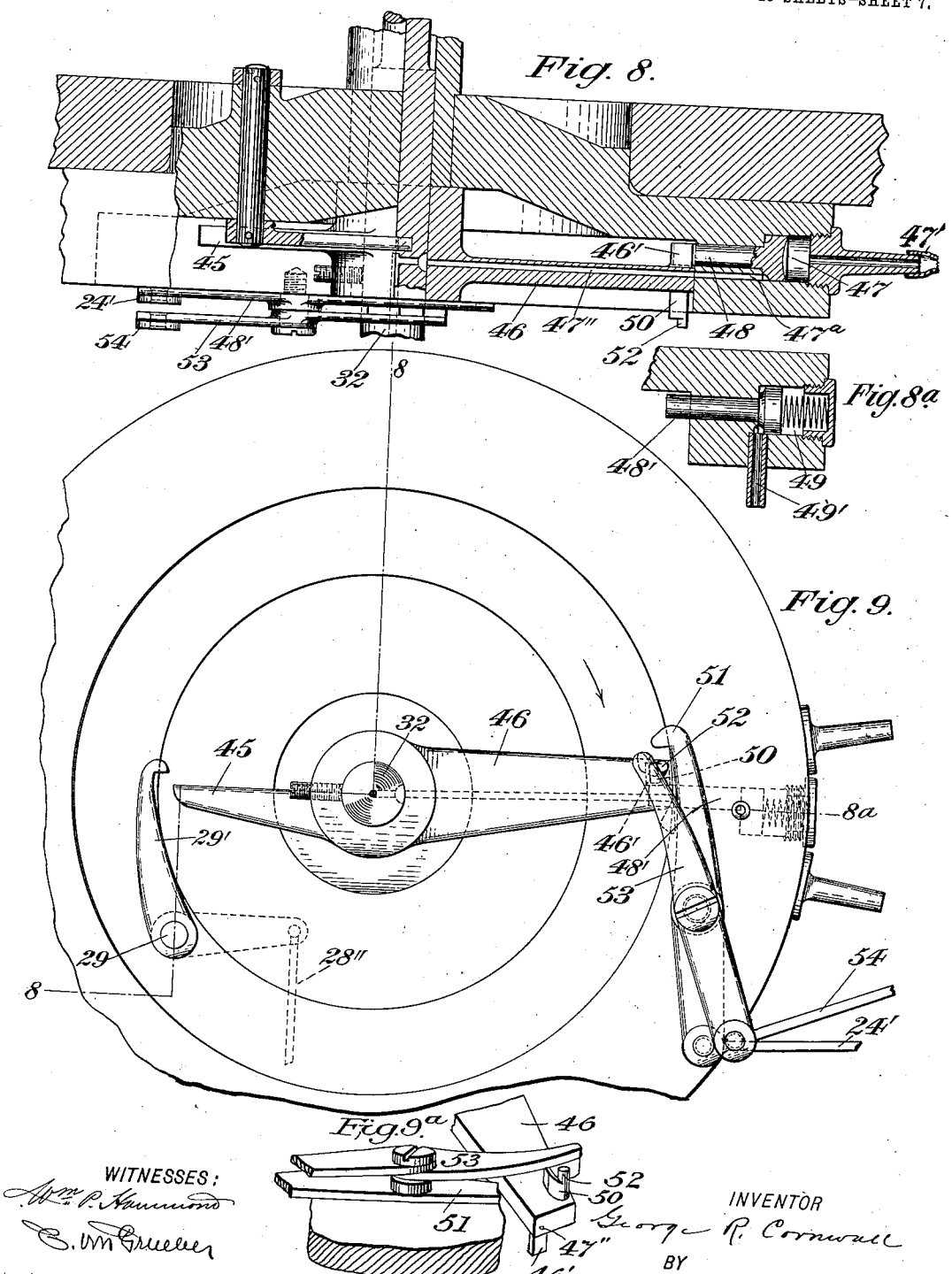

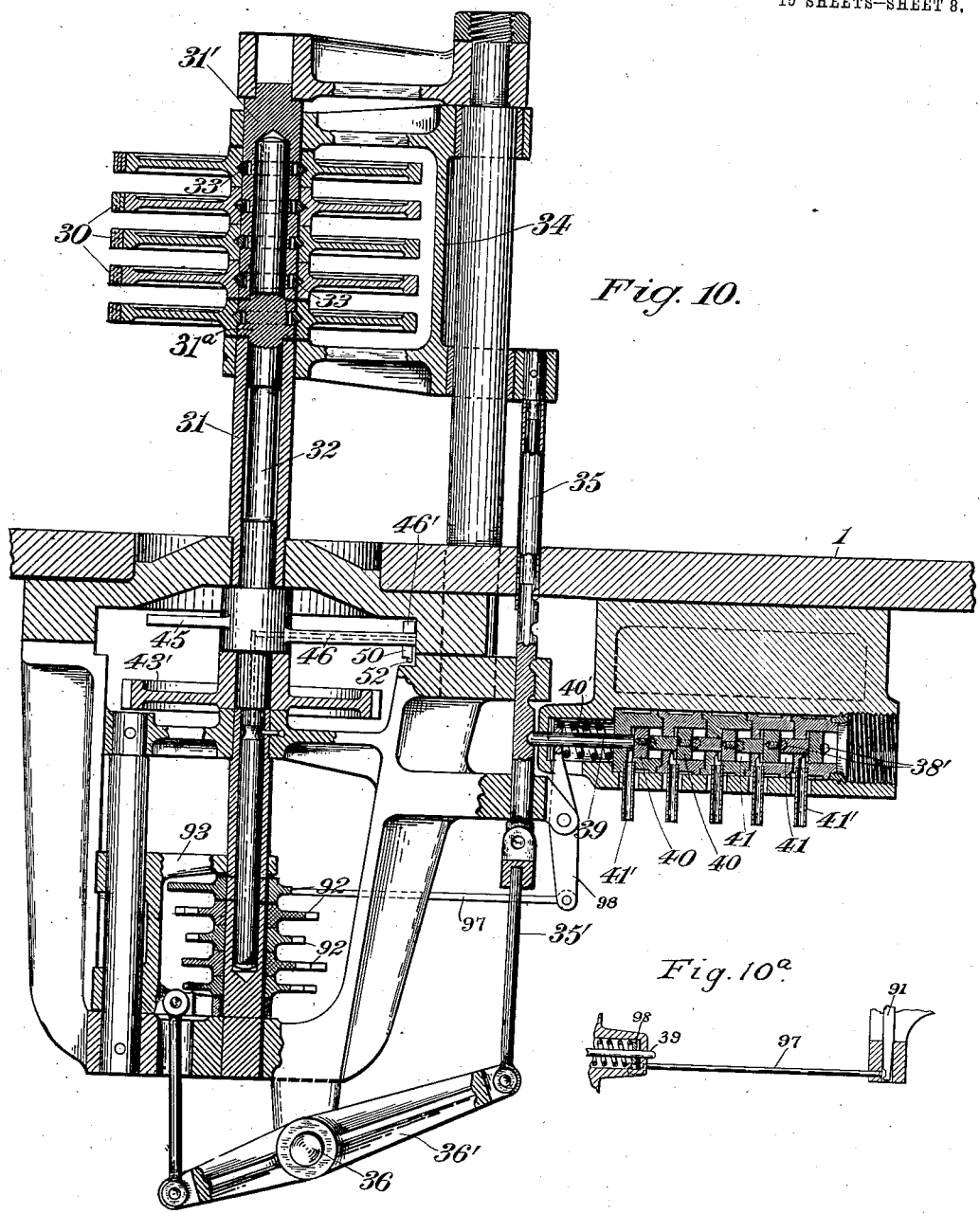

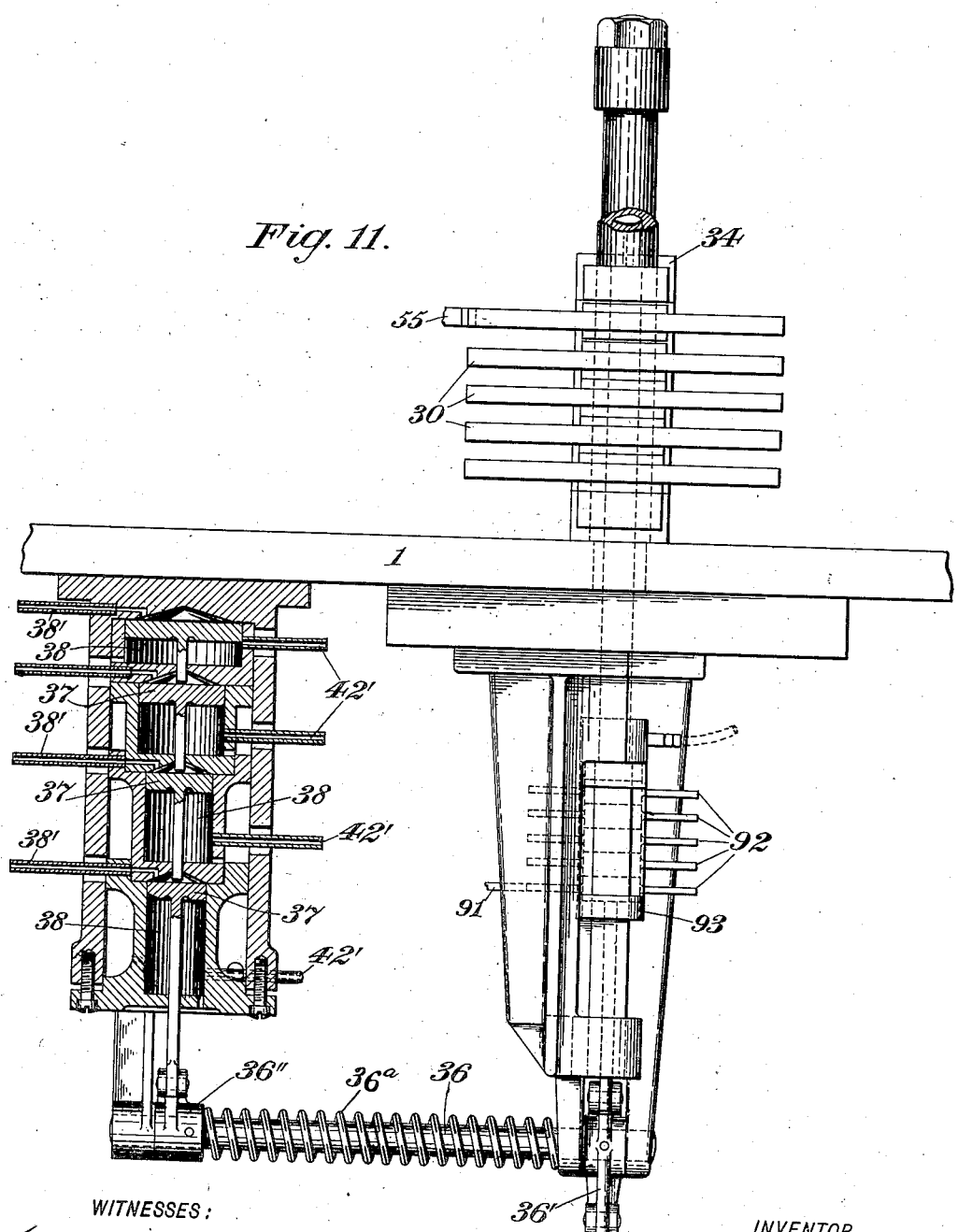

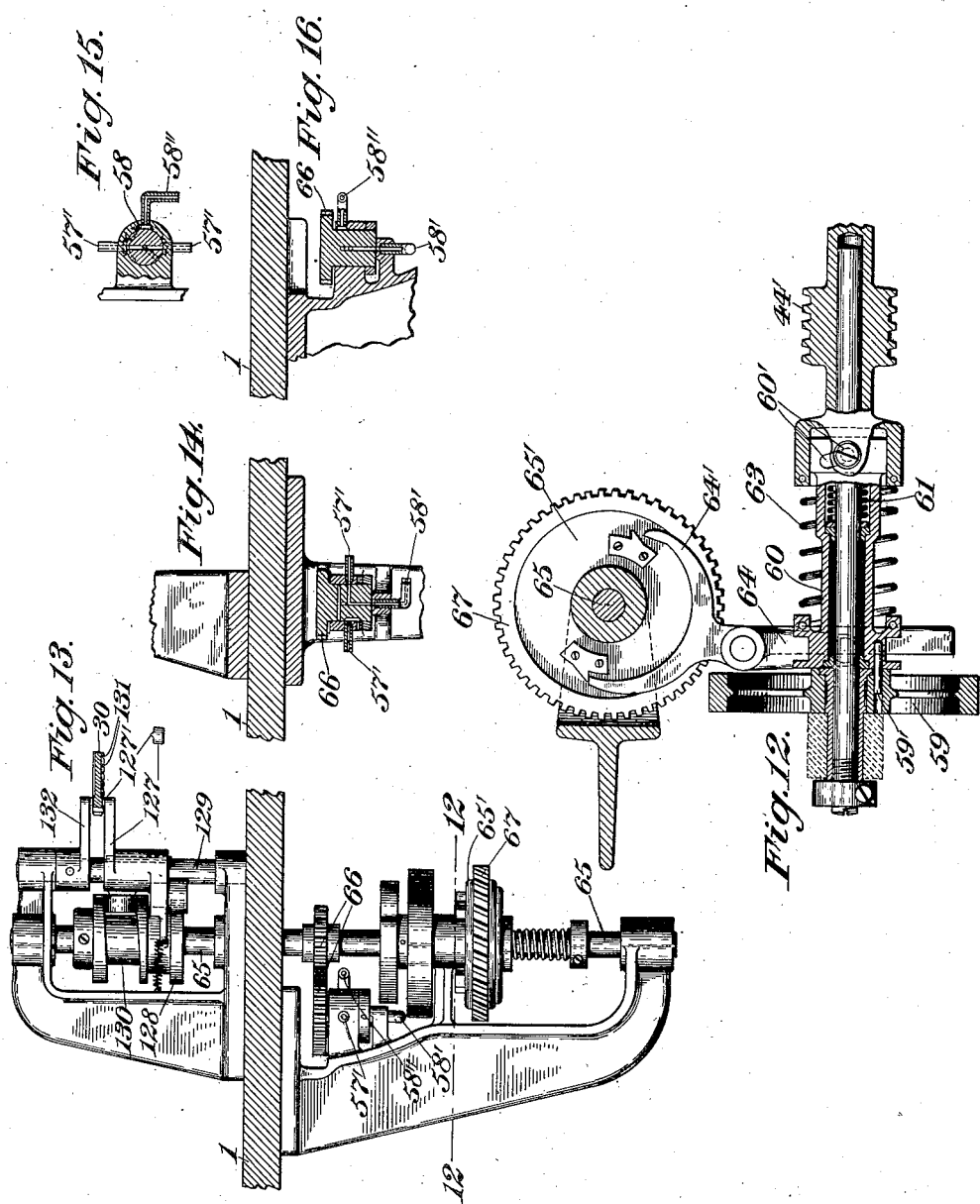

G. R. CORNWALL.
AUTOMATIC TYPOGRAPHIC APPARATUS.
APPLICATION FILED APR. 2, 1902. RENEWED SEPT. 28, 1914.
1,115,473.
Patented Oct. 27, 1914.
15 SHEETS—SHEET 11.
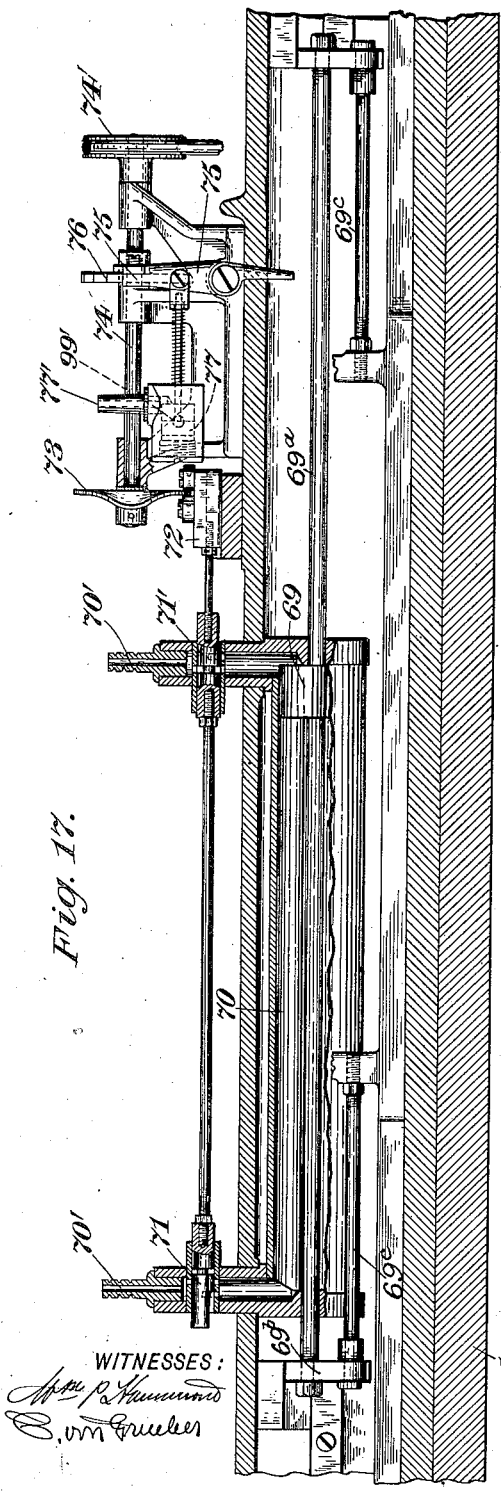
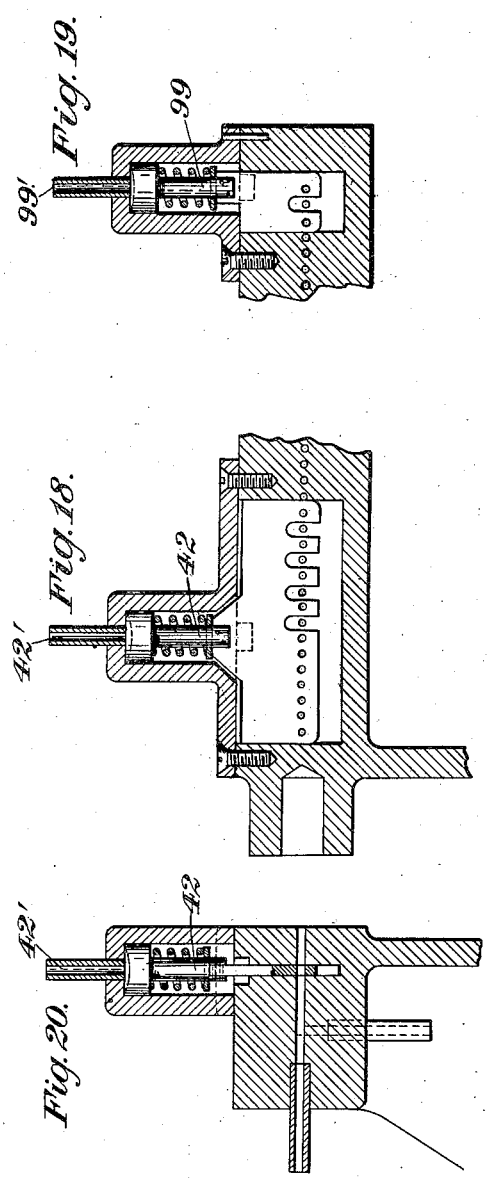

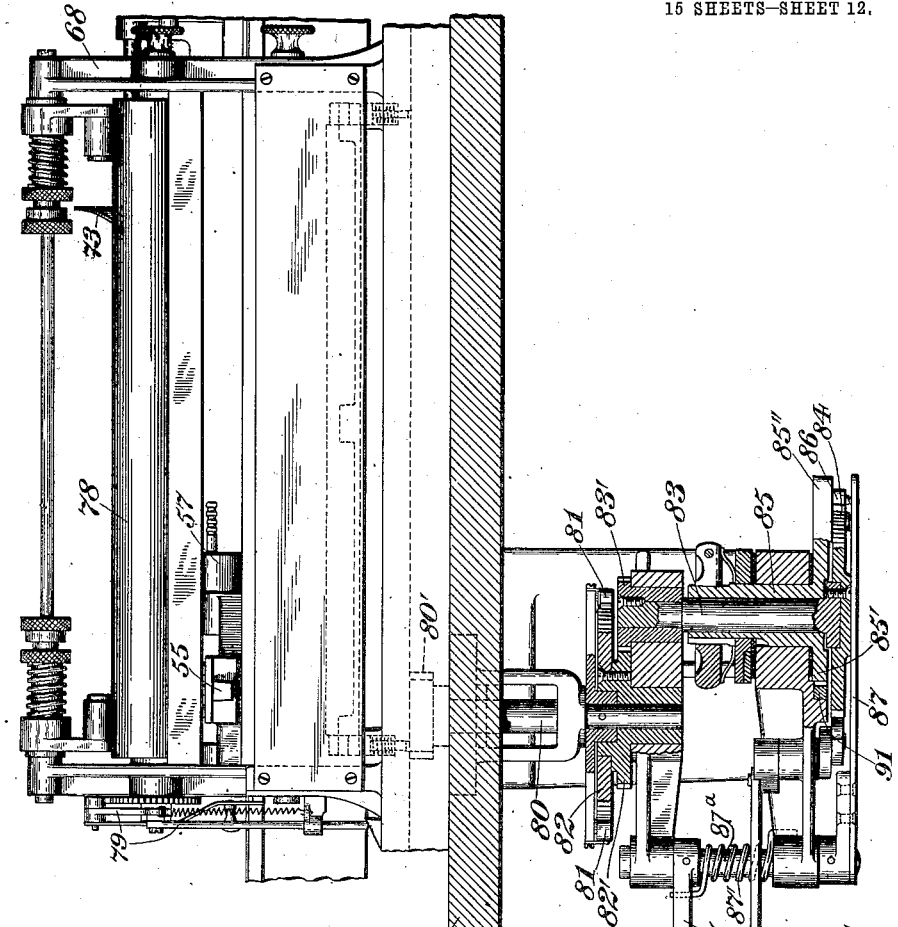
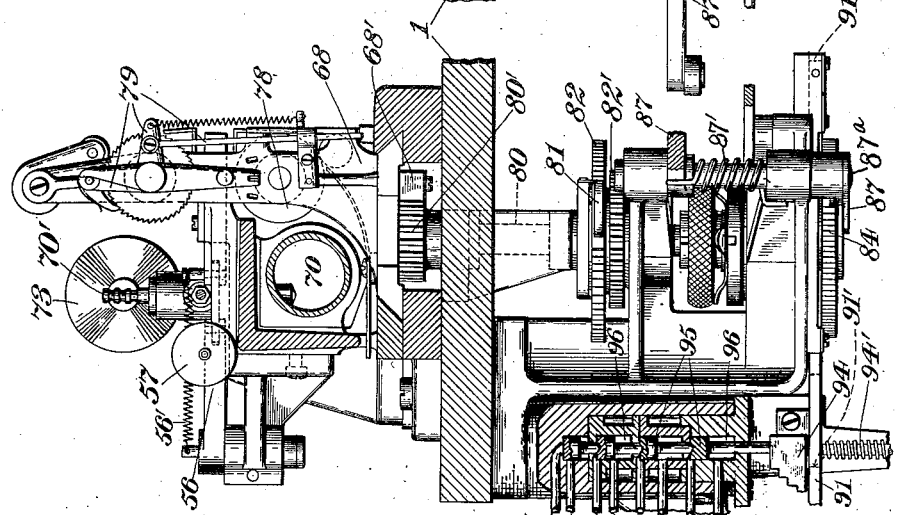

G. R. CORNWALL.
AUTOMATIC TYPOGRAPHIC APPARATUS.
APPLICATION FILED APR. 2, 1902. RENEWED SEPT. 28, 1914.
1,115,473.
Patented Oct. 27, 1914.
15 SHEETS—SHEET 13.
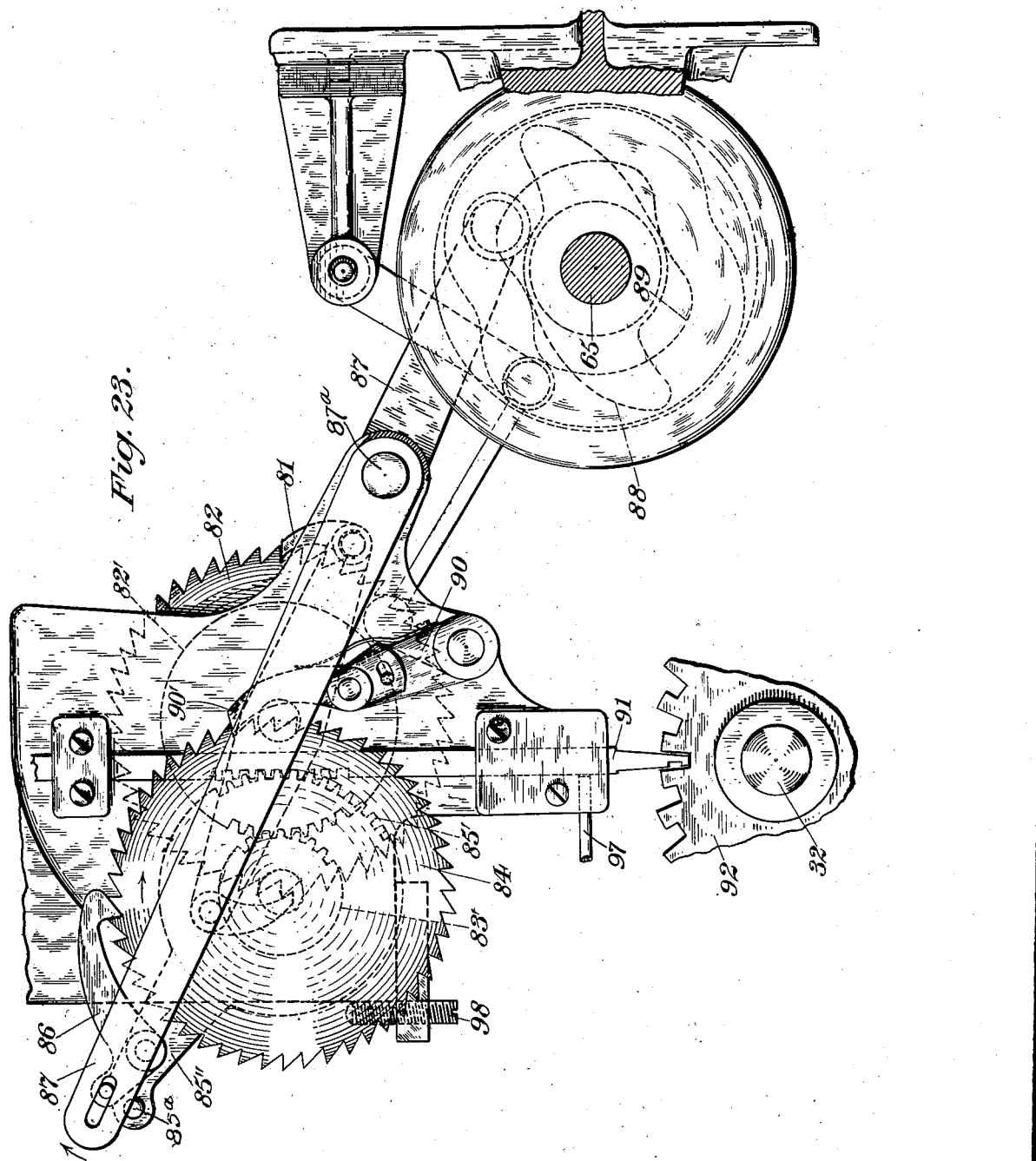

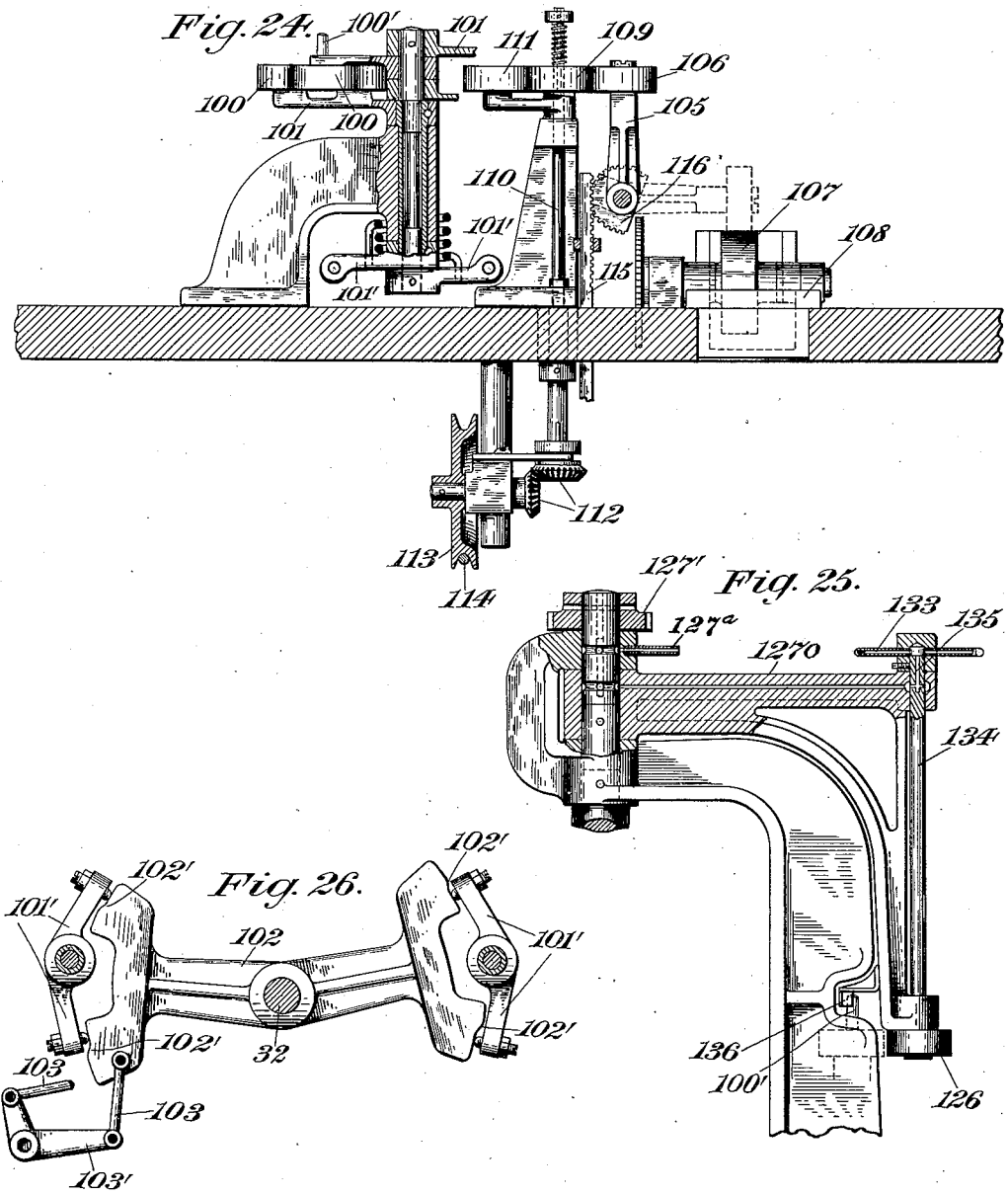

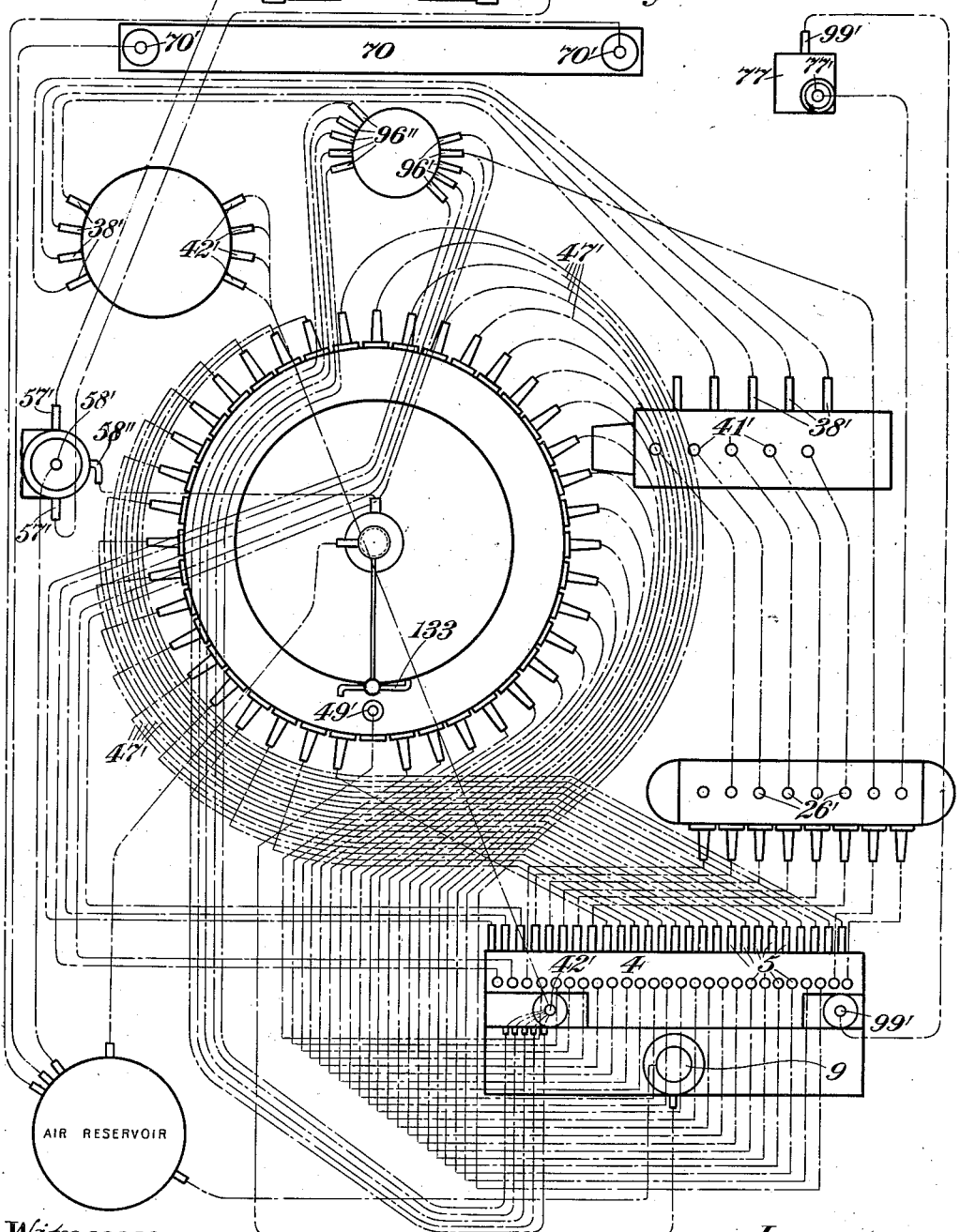

UNITED STATES PATENT OFFICE.

GEORGE R. CORNWALL, OF RYE, NEW YORK, ASSIGNOR, BY MESNE ASSIGNMENTS, TO JAMES G. COFFIN, TRUSTEE.

AUTOMATIC TYPOGRAPHIC APPARATUS.

1,115,473.     Specification of Letters Patent.     Patented Oct. 27, 1914.

Application filed April 2, 1902, Serial No. 101,020. Renewed September 28, 1914. Serial No. 863,798.

*To all whom it may concern:*

Be it known that I, GEORGE R. CORNWALL, a citizen of the United States, residing at Rye, in the county of Westchester and State of New York, have invented certain new and useful Improvements in Automatic Typographic Apparatus, of which the following is a specification.

This invention relates to improvements in automatic typographic apparatus, and its object is to provide a machine which is adapted to produce successive character impressions on a suitable surface, in such manner as to form justified printed lines, under the control of a controller device or strip which governs both the selection of the characters and word spaces and the justification.

Other objects of the invention will be set forth in part hereinafter and in part will be obvious herefrom.

In my application Serial No. 73,824, filed August 30, 1901, is described a machine for producing on a single controller strip a series of character representations arranged in transverse lines and corresponding to all the functions of character and space selections, etc., and also to the justifying operations, that are to be performed in the printing of justified lines of printed matter.

My present invention, in certain of its features, relates to a machine for utilizing a controller strip produced by the machine shown in said application.

The invention consists in the novel parts, arrangements, constructions, combinations, and improvements herein shown and described. The accompanying drawings, referred to herein and forming a part hereof, illustrate one embodiment of the invention, the same serving in connection with the description to explain the principles of the invention.

Figure 2:
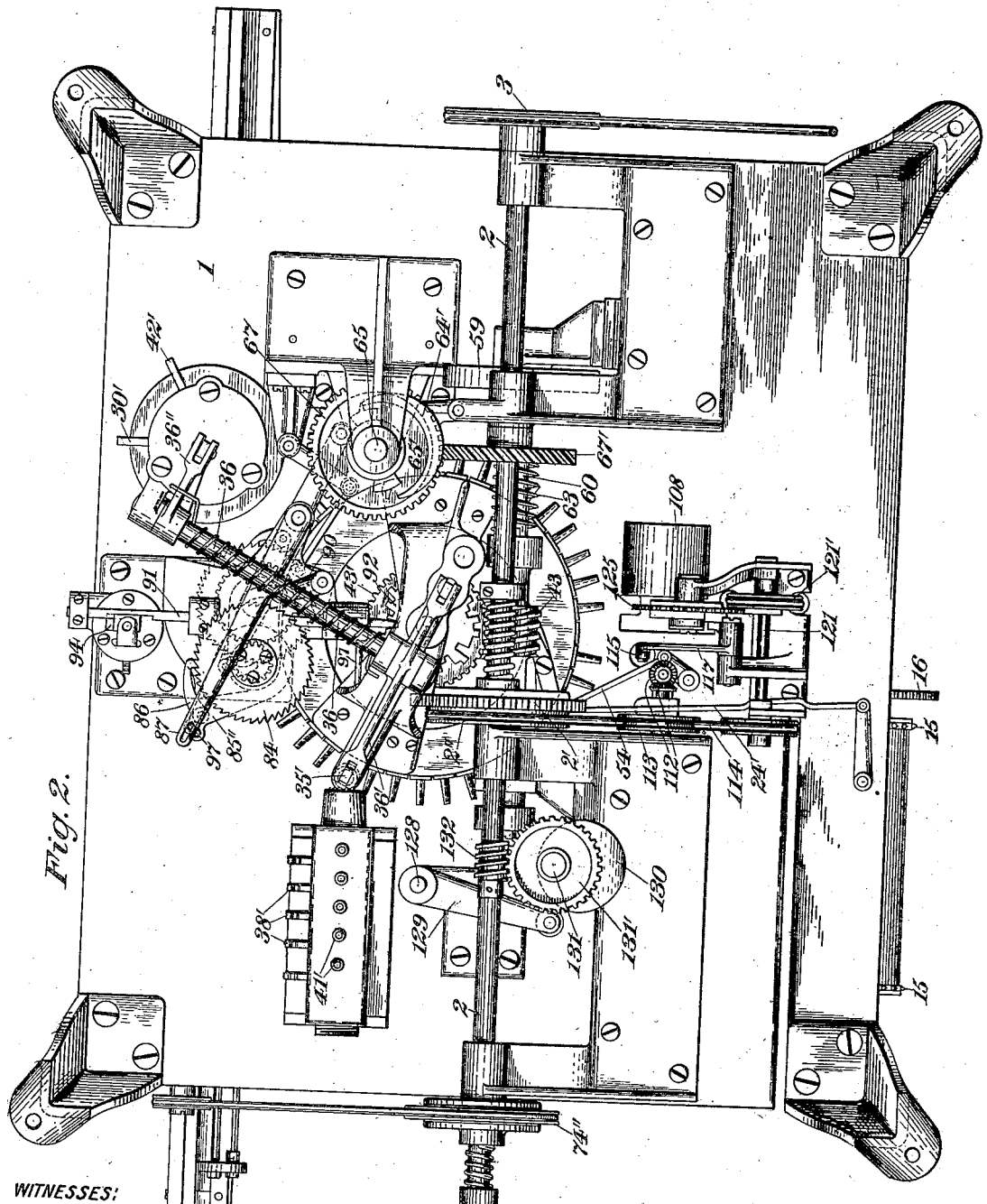
Figure 4:
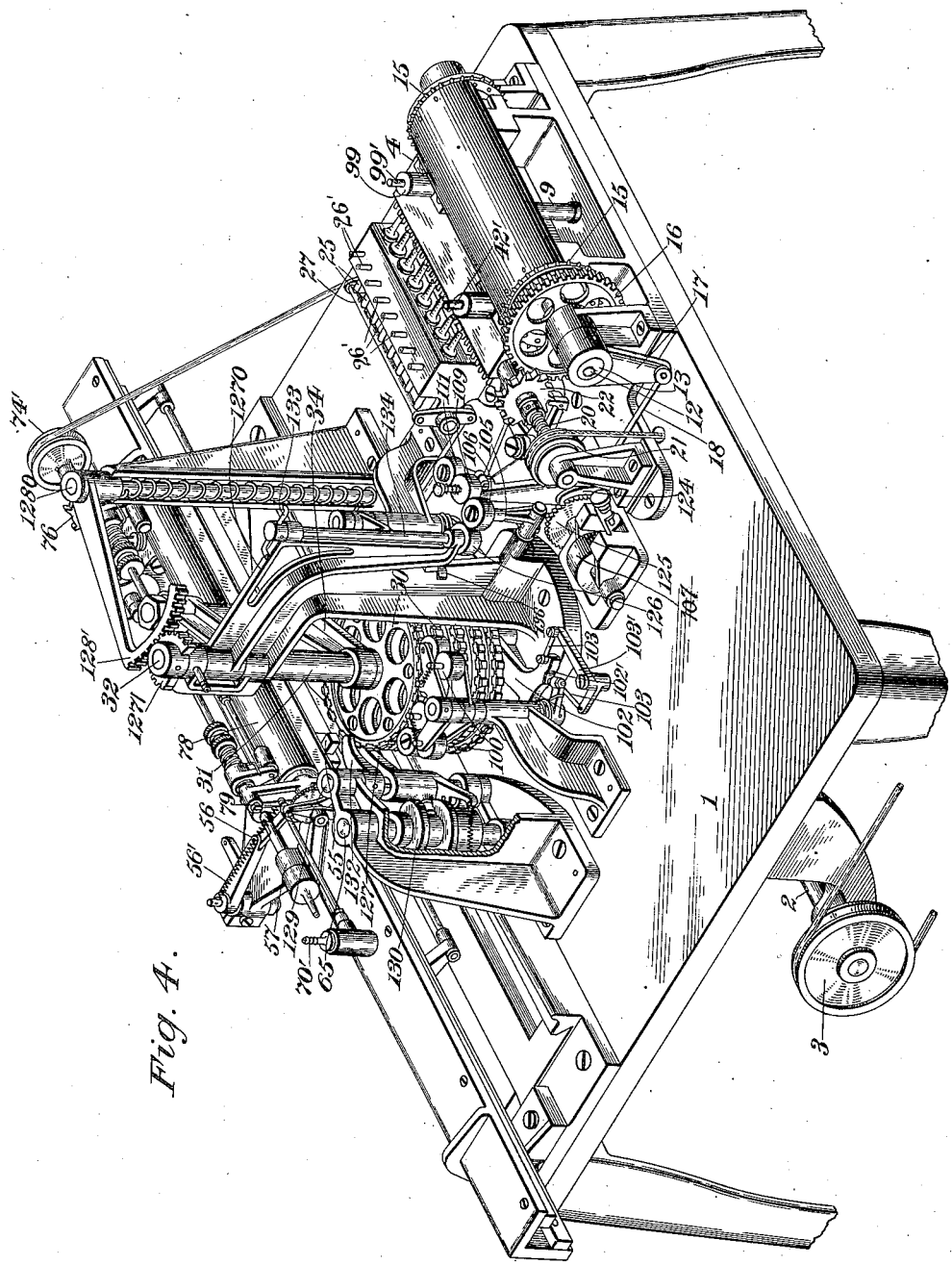

Of the drawings:—Figure 1 is a plan view of a printing apparatus embodying my invention. Fig. 2 is an inverted plan view of the same. Fig. 3 is an end view of the apparatus, and Fig. 4 is a perspective view thereof. Fig. 3ª is a view illustrating a section of the tape or ribbon which coöperates with the apparatus and governs and controls its operation. Fig. 5 is a section on the line 5—5 in Fig. 1. Fig. 6 is a partial plan view of the controller strip mechanism, and the type wheel stop mechanism controlled thereby. Fig. 7 is a detail section on the line 7, 7, in Fig. 6, of the controller strip mechanism. Fig. 8 is a partial section of the type wheel stop mechanism, on the line 8—8 in Fig. 9. Fig. 8ª is a detail section on the line 8ª in Fig. 9. Fig. 9 is a partial underside view of the parts shown in Fig. 8. Fig. 9ª is a detail view of the stop lever for arresting the type wheels. Fig. 10 is a vertical section of the type wheels and their supporting means, showing also the unlocking means therefor. Fig. 10ª is a detail of a carriage locking means. Fig. 11 is a partial sectional side elevation of the type wheel carrier and the associated shifting mechanism. Fig. 12 is a horizontal section on the line 12—12 in Fig. 13 of a momentum device associated with the type wheel mechanism to release the impression mechanism on arrest of the type wheel. Fig. 13 is a vertical section showing the mechanism which is controlled by arrest of the type wheel. Figs. 14 to 16 are detail views of a valve included in such mechanism. Fig. 17 is a longitudinal section of the carriage operating cylinder and its controlling means. Figs. 18 and 19 are sectional views of automatic valves for controlling the compressed air connections. Fig. 20 is a sectional view at right angles to Figs. 18 and 19. Fig. 21 is a vertical section showing the carriage mechanism and the feed controlling mechanism. Fig. 22 is a view at right angles to Fig. 21. Fig. 23 is an inverted plan of the carriage feed controlling mechanism. Figs. 24, 25 and 26 are detail views of the ink-distributing mechanism. Fig. 27 is a diagrammatic view illustrating the course of the fluid pressure to the various parts of the apparatus.

The apparatus comprises controller strip receiving and feeding means; type mechanism comprising type wheels and stop mechanism therefor acting under control of the controller strip to select the type to be printed; shift mechanism also controlled by the controller strip devices to bring the proper type wheel to operative position; carriage mechanism with line feeding means and means for moving the platen for space feeding; impression means coöperating with the type wheel means and the carriage mechanism to effect the impression, and justifying devices controlled by the selector devices to govern the carriage feed for word spacing in such manner as to justify the lines.

All the above-named parts are mounted on a suitable base or frame 1, and suitable power or driving connections are made to drive such of the various parts as are not operated pneumatically. Thus a main driving shaft 2 is driven by belt on its pulley 3 and is connected to drive the strip feeding means, the type wheel and other devices as hereinafter described. Connections are also to be provided with a source of compressed air, shown diagrammatically in Fig. 27, whereby air under pressure is supplied to the pneumatically controlled parts. The pneumatic connections between the several parts are constituted by rubber tubes, which are generally omitted from the drawings, to enable the other parts to be shown more clearly.

The controller strip mechanism, (Figs. 1, 6 and 7,) comprises a fixed block 4 provided with a series of holes or passages 5 and a movable block 6, provided with a long slot or series of holes 7 registering with those of block 4. Block 6 is mounted to slide horizontally on guides or supports 8, and over a fixed tubular post 9 which communicates with the service of compressed air. Between this post and the block 6 is a slide valve 10 that controls access of air from tube 9 to a passage 11 in the block 6 communicating with the opening 7 therein. A shaft 12 is mounted eccentrically by its collars 13 in bearings on the frame 1, this shaft passing through slots in supports 8 and having loosely mounted thereon the sleeve 14 that carries sprocket wheels 15 by which the controller strip is supported and fed, and gear 16 through which said sleeve is driven. This sleeve 14 engages with slotted portions of movable block 6 so that when the shaft 12 is turned and the sleeve is thereby caused to move transversely, the block 6 will be moved toward or away from the fixed block 4, to press the perforated faces of said blocks together or cause them to separate. The controller strip, carried by sprocket wheels 15, passes between said perforated faces, the perforations thereof registering with those in the blocks, and when the blocks are brought together, as above described, they close tightly on the strip and prevent leakage, while when they are separated, the strip is loose and may be fed forward. The movement of shaft 12 to effect this operation is caused by an arm 17 (see Fig. 5) on one of the collars 13, which through connecting rod 18, and other connections with the type wheel mechanism hereinafter described, are brought into action when the type wheels are stopped after having accomplished a complete revolution and giving all the impressions represented in one transverse line of perforations on the controller strip. Gear 16 is driven by gear 19 from a shaft 20 connected by friction pulley 21 and belting, with the main shaft 2, and normally held from rotation by an escapement wheel 22 engaged by an escapement lever on rock shaft 23 which is connected to rod 18 aforesaid, so that as the said lever is rocked through connections 54 it throws the block 6 slightly back by means of connections 24', 24, enough to free the controlling strip but not enough to free the gearing, and then releases the escapement and allows the sprocket wheels to be turned through the frictional connection from the main shaft, thereby bringing a new line of perforations to registering position. Immediately thereafter the valve 10 above referred to is opened momentarily by connections 24, 24' (Fig. 6) with the type wheel mechanism, so as to permit compressed air to pass through the perforations now in line.

The passages 5 in block 4 are connected by nipples and tubular connections, with various devices for controlling the type wheel and carriage mechanisms. Thus the first five holes are assumed to be connected to the justifying devices, the next six and the last two holes to a special controlling mechanism controlling various special functions, while the remaining holes are connected respectively to the selection stop devices for the type wheel. These passages and holes form the selective means whereby the controller selects the various mechanisms and causes the same to operate to produce the typographic composition which the perforations therein represent. This special controlling mechanism comprises a series of piston devices 25 mounted to slide in cylinders or passages 26 in a containing block, and said passages have valve ports 26' which are controlled by the pistons 25 acting as valves. All the pistons have rods or pins that act on a swinging frame or bail 27 connected by rod 28, arms on rock shaft 28' and rod 28'' with an arm on the rock shaft 29 of a stop hook or detent 29' adapted to engage an arm 45 on the type wheel shaft. A spring 29'' tends to hold this detent out of the path of said arm but when any one of the pistons 25 is operated by air pressure coming through a controlling strip perforation and a passage 5, the swinging frame 27 will operate the hook or detent 29' to move it into the path of the arm on the type wheel shaft. The first passage 26 in this special controlling means has no other function and the port thereof serves only as an exhaust port, but the ports 26' of the other passages 26 are connected by tubular connections to type wheel shifting, carriage controlling and other mechanisms for performing the various operations of the apparatus hereinafter referred to other than character-selecting operations.

The type wheel mechanism comprises the series of rotatable type wheels 30, (Figs. 5 and 10) mounted to slide vertically, on a fixed hollow arbor 31 and a stationary arbor 31' in line therewith. The type wheel shaft 32 is mounted to turn within these arbors 31, 31' and has a collar 31ª of the same diameter as said arbors and occupying the space between the ends of said arbors, so that the type wheels can slide over this collar in passing from one arbor to the other. Each type wheel has a spline connection with the arbor 31 so as to hold it in a definite angular position while on said arbor, and the type wheel shaft collar also has a groove engaging with the spline in the type wheels to cause the type wheel, which is for the time being on the collar, to rotate therewith. Split spring rings 33 are provided engaging with annular grooves in the arbors and type wheels, to snap and retain the type wheels into exact longitudinal positions.

A shift frame 34, Figs. 10 and 11, has arms spanning the series of type wheels, and is connected by rods 35, 35' to one end of a rocking lever 36' on a rock shaft 36, whose arm 36'', Fig. 11, is connected by a rod or link to the first of a series of shift pistons 37 arranged one behind another, in a series of cylinders 38, so that the operation of any one of the pistons will shift the type wheels. A spring 36ª tends to hold this shifting device in normal position. The cylinders are of different length so that the operation of each one of them will bring to the operative position opposite the platen and impression means, a corresponding one of the type wheels. The type wheels are locked in normal and shifted positions by a locking dog or bolt 39, Fig. 10, engaging in any one of a plurality of notches in the shift frame rod 35 and connected to a series of pistons 40 working in cylinders 41 so that admission of air pressure to any of said cylinders will cause withdrawal of the locking bolt, against the action of a spring 40'. The pistons 40 are each secured at the proper distance apart upon a rod 40ª which passes through all of the cylinders 41 so that upon pressure being admitted to any of the ducts 41' the bolt 39 will be retracted. Each of the cylinders 41 is connected through tubular connections 41' to the exhaust 26' or port of one of the valve devices or passages 26 aforesaid and the exhaust port of each cylinder 41 is connected by a connection 38' with a corresponding one of the shift cylinders 38. From the latter cylinders exhaust connections 42' lead to the operating cylinder of a shut-off valve 42, see Figs. 1, 18 and 20, adapted to cut off passage of air in all the holes that correspond to type wheel shift operation. Each of the pistons operated by the air pressure in its passage from the controller strip mechanism back to the said valve 42 operates as a valve which prevents the passage of air to the succeeding cylinders until it has performed its own operation. Thus the compressed air passes first to a cylinder 26 operates the special controlling means heretofore referred to and opens the port therein, then passes to an unlocking cylinder 41 and unlocks the shifting frame, and at the same time opens communication to one of the shifting cylinders 38, the air then passing to the latter and shifting the type wheels and simultaneously opening a passage to the valve 42 which then operates to shut off the supply connection, whereupon the locking bolt 39 snaps into engagement and holds the type wheels in shifted position. When the wheels are to be brought back to normal position, air is passed through one of the valve devices 25, 26 to the end cylinder 41 and unlocks the shifting frame to enable it to be restored to normal position, the exhaust port from this unlocking cylinder being connected directly to the cylinder of the shut-off valve 42 without traversing any shifting cylinder.

The type wheel shaft 32 is rotated by engagement of special gears 43, 43', Fig. 5, on said shaft and on a shaft 44 carrying a pinion 44' engaged by a frictional gear 2' on the main driving shaft 2. Two arms 45, 46, on shaft 32 are adapted to coöperate respectively with the detent hook 29' above referred to and with a series of stop pins or devices 48 arranged in circumferential order, Fig. 6. Each of these pins is provided with a piston working in a cylinder 47 whereby the pin may be advanced or retracted into or out of the path of a lug 46' on arm 46. One of the pins, the circumferential axis of which I term the starting pin, or " blank " pin, indicated at 48' is pressed into the path of said lug by a spring, and its cylinder 49 is controlled by connection 49' with the valve 10 of the controller strip mechanism. The other stop pins are normally out of the path of the lug 46', and these cylinders are connected respectively with the character selecting holes 5 on block 4, by tubular connections 47', so that when air passes through any of said holes it will project a corresponding one of the stop pins into the path of the lug 46'. These character selecting stop-pins are returned to normal position by air passing into the front of the cylinders through passages 47ª, from a conduit 47'' leading through arm 46 and through shaft 32 and connection 58'' to the valve 58, see Fig. 15. The arm 46 also has a cam projection 50, which engages the end of a lever 51 connected through rod 24' and lever 24 with the valve 10 that controls passage of air to the controller strip mechanism. A pin 52 also on arm 46 projects into engaging relation with two cam lugs on a lever 53 connected by rod 54 and rock-shaft 23 to the rod 18 governing the controller strip feed.

The impression mechanism comprises a ram 55 sliding in a fixed guide (Figs. 1 and 5) and operated by toggle connection 56 with the piston rod of cylinders 57, 57 which are connected through the valve 58 and connection 58' with the air pressure supply. Valve 58 at each semi-rotation opens communication at 57' to one or the other cylinder 57, so as to cause the toggle to cross the dead center and so give a full throw to the ram at each movement of the piston rod, or at each semi-rotation of valve 58. A spring 56' snaps and holds the toggles away from dead center position on either side. This valve 58 is operated upon arrest of the type wheel shaft 32 by a momentum device (Fig. 12) comprising a flywheel or weight 59 loose on said shaft and connected by pin and hole connection 59' to an end of a sleeve 60 also loose on said shaft but connected thereto by a pin and inclined slot connection 60'. A spring 61 serves to press the sleeve 60 against wheel 59 but on arrest of the shaft 32 the momentum of wheel 59 causes it to continue to rotate against the torsional action of a spring 63, and in this rotation the sleeve 60 is moved endwise by the inclined slot connection and a yoke 64 that engages with a grooved collar of said sleeve, is thereby moved to cause an escapement lever 64' thereon to release a tooth of an escapement wheel 65' on a shaft 65 connected by gears 66 with the valve 58. A friction gear 67 tends to drive this escapement, said gear being engaged by spiral gear 67' on main driving shaft 2. Shaft 65 when released, makes a semi-rotation and is then arrested by its escapement. During this semi-rotation it performs the following functions: It locks the type wheel in exact position for printing, controls the impression mechanism to effect the impression, and then controls the carriage feed mechanism to allow of the proper feed. The type wheel locking is effected by a lever 127 (see Fig. 13) operated by a cam 128 on the shaft 65 and mounted to slide on, but turn with, a pivot shaft 129, said lever being moved longitudinally on said shaft 129 by a cam 130 on shaft 65, so that the lever 127 is swung partially into position beneath the operated type wheel and is then moved endwise on shaft 129 to cause a V-shaped tooth 127' on said lever to engage notches 131 in the type wheel. An arm 132 is pinned to shaft 129 and swings therewith and with lever 127 and acts as an abutment.

The carriage frame 68, Figs. 1, 17, 21 and 22, slides on a suitable guide frame and is moved forward and back thereon by a piston 69 working in a cylinder 70 and connected by a piston rod 69ª and connecting links 69ᵇ, 69ᵇ and rods 69ᶜ, 69ᶜ to the carriage. Ports at opposite ends of this cylinder lead by connections 70' to the air pressure supply and are controlled by valves 71, 71' connected by a rod to a sliding block 72, operated by a wave cam 73 on a shaft 74 which is driven by pulley 74' connected to frictional pulley 74'' on the main driving shaft 2, and is controlled by an escapement lever 75 engaging escapement wheel 76 on shaft 74. The escapement lever 75 has a tail projecting in the path of carriage frame 68, so as to be struck thereby when the carriage reaches the starting end of its travel, the consequent release of shaft 74, and movement of valves 71, 71', admitting air to one end of the cylinder 70 and opening the other end to exhaust so as to press the carriage frame in reverse direction, the movement in such direction being, however, limited by the action of feed-controlling means. When the end of the line has been reached the controller strip mechanism sends an impulse through a passage 5 and one of the valve devices 25, 26, through connection 77' to a cylinder 77 operating the escapement lever 75 to admit air to the other end of the carriage operating cylinder, to effect the return of the carriage. The carriage then moves back at once under this pressure to the starting position. A connection 99' leads from the cylinder 77 back to the cylinder of a valve device 99, see Figs. 1 and 19, similar to the valve device 42 and controlling the passage of air through this line perforation hole 5. The hole 5 next to the "line" hole is for "indent" operation and the valve device 25, 26 and is connected therewith leads to one of the justifying cylinders hereinafter described to give a definite feed at the beginning of a line. The carriage frame 68 carries the paper rolls 78 which in conjunction with suitable guides to lead the paper to be printed, between the impression device and the type wheels, and suitable mechanism indicated at 79 in Figs. 21 and 22 is provided to feed the paper from line to line.

The carriage feed controlling mechanism, Figs. 21, 22 and 23, serves to feed the carriage, after each impression, a distance corresponding to the space requirements of the impressed character, and it also serves, in conjunction with the justifying means, to feed the carriage, at the word spaces, sufficient distances to make up a justified line, these distances being generally distributed over several or all of the word spaces in the line. A rack 68', Fig. 21, on the carriage frame is engaged by a gear 80' on a shaft 80 connected by pawl devices 81 with a ratchet wheel 82 loose on shaft 80 and rigidly connected with a gear 82'. Another shaft 83 carries a gear 83' engaging said gear 82', and also carries a ratchet wheel 84. A sleeve 85 loose on shaft 83 has a segment gear portion 85' and an arm 85'' carrying a pawl 86 which is adapted to engage the ratchet wheel 84 and is connected (see Fig. 23) by a pin and slot connection with a lever 87 pivoted on a spring rock shaft 87ª, said lever being operated by a cam 88 on the shaft 65 that is released at each impression. Another cam 89 on this shaft operates by a link, a lever 90 carrying a dog or detent 90′ that normally engages the ratchet wheel 84. Cam 89 is a pivoted cam, while cam 88 acts against the spring 87′ on the rock shaft 87ª. The segment gear 85′ engages a rack bar or slide bar 91 which is adapted at one end to engage the periphery of one of a series of rotary stop devices or stop wheels 92. Said wheels 92 correspond to the several type wheels and are mounted on fixed arbors and on a sleeve on the type wheel shaft (see Figs. 5, 10 and 11), similarly to the mounting of said type wheels, being controlled by vertically movable frame 93 which is connected to the lever 36′ that shifts the type wheels, so that when any type wheel is brought into operative position by the shifting frame, a corresponding stop wheel 92 will be brought opposite the stop bar 91, and as the type wheel is turned to bring a particular character to the printing point, the said stop wheel will be turned to bring a notch, tooth or step opposite the bar 91 corresponding in depth or position to the length of feed required for that character. The slide bar 91 also has a notch or shoulder 91′ engaging with a stepped block 94 operated by a series of pistons 95 working in cylinders 96 which are connected by tubular connections 96′ to certain of the nozzles or passages 5 in the block 4 of the controller strip mechanism. In each of the stop wheels 92 an extra deep notch is made at the point corresponding to "word space", which is the point at which the type wheel system is arrested by the stop lever 29′. Under these circumstances the bar 91 is not arrested by the stop wheel and it moves under the influence of the carriage driving power (in this case the air cylinder for the carriage) until its shoulder 91′ strikes the particular step of block 94 which has been set in its path. The cylinders 96 (Fig. 21) are of different length so that the position of block 94 and consequently the amount which the bar 91 allows the carriage to move depends on which one of the justifying perforations 5 in the block 4 has transmitted air. A spring 94′ tends to return the stepped block 94 to normal position as soon as the air pressure is removed. Each of the cylinders 96 has an exhaust connection at 96″ back to the cylinder of valve 42 that controls all the justifying passages as well as the shift passages, so that when any justifying portion has been operated it allows air pressure to pass to cylinder of valve 42 and to cut off the pressure from the justifying cylinders 96. The block 94 will, however, be still held in operated position by engagement of bar 91 therewith, but when the said bar is retracted the block 94 will be returned to normal position by the spring 94′. Retraction of the bar 91 after each operation is effected by the lever 87. At each printing operation the cams 88, 89, make a semi-rotation, being released by the momentum device controlled by arrest of the type wheel shaft, and the levers 87, 90, are operated in succession. During the latter part of the semi-rotation lever 87 moves in opposite direction to arrow in Fig. 23, throwing pawl 86 out of ratchet wheel 84 and then when the pawl strikes a pin 85ª on the arm 85″ said arm is turned so as to retract the bar 91, this movement being finally stopped by a screw stop 98. Pawl 86 has two functions: It engages ratchet wheel 84 and thereby connects arm 85″ and segment portion 85 with said ratchet wheel, and therethrough with the carriage driving means, causing said segment portion 85 to move rod 91 when the carriage is fed along. Pawl 86 is connected also to lever 87 by pin-and-slot connection, and therethrough to cam 88 on shaft 65, whereby when the type wheel has been arrested in position to make an impression the carriage feed control mechanism is operated as described. On the next release of cams 88, 89, the lever 87 passes off the end of cam 88 and moves in the direction of the arrow in Fig. 23 under the influence of its spring causing pawl 86 to again engage ratchet wheel 84 and the lever 90 then moves to release dog 90′ from ratchet wheel 84, whereupon the whole system of gearing moves under the influence of the carriage driving air cylinder until the bar 91 is arrested either by one of the stop wheels 92 or by the stepped justifying block 94 as the case may be. On return movement of the carriage the pawl connection 81 slips so that this system of gearing remains stationary.

When the type carriers are to be shifted it is necessary to stop the shaft thereof by the hook 29′, and the momentum device above described will operate to release the cam shaft 65 and allow one semi-rotation thereof. As it is not desirable to allow the carriage to feed at such times, I provide a connection, comprising for example a dogging bar 97 (Fig. 10ª) engaging the controlling bar 91 and operated through a lever 98 engaged by the unlocking bar 29 for the type carrier shifting frame 34 so that when the shifting frame is unlocked the feed controlling bar 91 is locked.

The operation of the apparatus so far described is as follows: A controller strip of paper or other material with perforations arranged in transverse lines on the sprocket wheels 15 and between the blocks 4, 6, and the driving and fluid pressure connections having been made, the type wheel shaft 32 will rotate, Figs. 4, 6 and 7. Just before the starting pin 48' is reached (Figs. 8 and 9) the lug on arm 46 engages the lug on lever 53 and the connections thereof with escapement 22 (Figs. 4, 5 and 6) allows the feed mechanism to move the controller strip one step forward, bringing a new transverse line into operation and at the same time pressing the block 6 to bind the strip tightly between the two blocks 6, 4. The arm 46 then moves lever 51 to open valve 10 and allow compressed air to flow through such perforations as may exist in this transverse line of the strip. At the same time air will pass by connection 49' to the starting pin cylinder and withdraw this pin. This pin is as a matter of fact always withdrawn in this manner just as the type arm strikes it. Its object is to start the type wheel from the proper position when the machine has been at rest. In the case of character perforations the air will pass direct to the stop controlling cylinders 47 around the type wheel shaft 32 causing as many stop pins to project as there are character perforations in this transverse line, and the number of such perforations is equal to the number of characters that occur in the matter to be printed in the same order of succession in which they occur in one round or rotation of the type wheel. Thus, if the type on the wheel are arranged in the order of the usual alphabet and the word "and" is to be printed, the letters "a n" could be represented by two perforations on one transverse line, but the letter "d" would have to be represented in the next line. Assuming also that no word space or other special function is to be performed under the control of this line, the type carrier will rotate until its arm 46 strikes the first one of the projected stops 48, the consequent arrest of the type wheel shaft causing the momentum device to release valve 58 which turns one half rotation. During the same rotation air pressure is admitted through connection 57', see Fig. 14, to one of the impression cylinders 57, the other cylinder being opened to exhaust, and then by connection 58" the same valve allows fluid pressure to pass to the conduit in the type wheel shaft 32 and through the arm 46 to the cylinder 47 of the projected stop pin, thus pushing this pin back as soon as impression has been made. Then the type wheel shaft resumes its rotation until the arm 46 strikes the next pin that has been projected and the above operation is repeated. When the type wheel has made one round it has therefore printed as many characters as occur in the matter to be printed in the order in which the characters occur on the type wheel. On each operation of the momentum device by the arrest of the type wheel shaft, the space controlling reciprocating member 91 is withdrawn by cam 88 on shaft 65 from the rotary step devices 92, preliminary to the next character selecting operation, and then when the character has been selected the same rotation of the shaft 65 first allows the reciprocating bar 91 to move toward the stop device until it is arrested by the particular stop portion that corresponds to the character to be printed, thus allowing the carriage to feed the proper distance. Air is then transmitted by valve 58 to the impression device to make the impression and finally the reciprocating bar is again retracted ready for the next step. The operation proceeds in this manner until a word space is reached, when a corresponding perforation in the controller strip allows air to pass to one of the special cylinders 26, 25, causing bail 27 to operate and moving the hook 29' into the path of the arm 45. Then as soon as the type carrier passes the starting pin 48' it is arrested by the hook, and the position of the rotary stop device is then such as to bring its deepest notch opposite the bar 91, and said bar will be allowed to proceed to the extreme movement for maximum feed unless arrested by the justifying mechanism. Assuming that there is also a justifying perforation it will cause the justifying block 94 to be set at a position to arrest the bar 91 when it has allowed the carriage to move one or more units in addition to the minimum word space, according to the amount required for justification of the line. When the end of the line is reached the line perforation in the controller strip sends through the corresponding valve device 25, 26, an impulse to the valve device 77 controlling the carriage, causing the carriage to return to the starting point as above described. The shifting operation takes place only when the type wheels are at the starting point, each shifting perforation controlling one of the special cylinder devices 26, 25, which all operate the bail 27 to turn hook 29' into position to arrest the type carrier. The type carrier is then unlocked and shifted as above described by the cylinder devices. The carriage is prevented from feeding during this shifting operation by the locking device 97 that engages with the reciprocating member 91 when the type wheels are unlocked.

Certain further features of my invention relating to the ink ductor and distributing means are shown in detail in Figs. 24 to 26. Figs. 1 and 4 show the general arrangement of the inking rolls 100 supported on pivoted arms 101 in the plane of the operating type wheel, a suitable spring being applied to press the rolls toward the type wheel. A frame 102 pivoted about the type wheel on shaft 32 has cam portion 102' engaging with pins on arms 101' rigidly connected with said arms 101 to remove the rolls 100 from the type wheels, said frame 102 being actuated by link and bell crank connections 103, 103' from an arm 104' on the rock shaft 28' (Fig. 6) which is operated at each shifting operation of the type wheel, as above described. The inking rolls are thereby removed from the type wheel during such shifting operation. The ductor mechanism comprises a vertically swinging arm 105 carrying a roll 106 which when the said arm is depressed contacts with the fountain roll 107 in the ink fountain 108, and when the said arm is elevated contacts with a roll 109 on a vertical spindle 110 and running in contact with another roll 111. By means of bevel gears 112 spindle 110 is connected with a pulley 113 connected by belt 114 with a pulley 2'' on main shaft 2. When the ductor roll is in contact with the roll 109 the ink thereon is rapidly distributed around all the rolls 109, 111. The vertical swinging movement of ductor arm is effected by a rack 115 engaging a gear 116 thereon and itself operated by a bell-crank lever 117 pivoted thereto and engaged by a cam 118 on a shaft 119, see Fig. 5, driven by a Geneva movement 120 or other slow speed intermittent gear from a shaft 121 carrying a pulley 121' engaged by the belt 114 aforesaid. An eccentric 122 on the shaft 119 operates through its link a lever 123 and carrying a pawl device 124 that moves a ratchet 125 on the fountain roll shaft so as to slowly progress said roll. Ink is carried from the rolls 109, 111, to the inking rolls by distributing mechanism comprising the outer series of inking rolls 100 and a roll 126 mounted on a horizontally vibrating frame 1270 pivoted in line with the type wheel shaft 32, said roll being adapted as said frame swings one way or the other to contact alternately with the outer series of rolls 100 on each side, and in passing a middle position to contact with rolls 109, 111. The arm or frame 1270 is vibrated by a gear 1271 on the arbor thereof, engaging with a segment gear 128' on a rock shaft 1280 urged in one direction by a spring and moved in the reverse direction by an arm 1290 (see dotted lines Figs. 1 and 2) on said shaft engaging a cam 1300 on a shaft 1310 carrying a worm gear 131' engaged by a worm 1320 on the main shaft 2. Means are provided for rapidly rotating this ink distributing roll 126 while it is in contact with the outer ink rolls 100, such means consisting of a fluid pressure reaction device or nozzle device 133 Fig. 25 on the spindle 134 of said frame 1270 and connected by a duct 135 through said shaft, the bearings therefor, and through the frame 1270 and its bearings, to a fluid pressure supply pipe 127ª. A cam lug 136 on the swinging frame 1270 engages the pivot 100' of one of the distributer rolls 100 as the frame swings around, so as to free it from the other rolls 100, and the rotation of the roll 126 then transfers the ink to this roll 100 and when the latter again contacts with the other rolls 100, under the influence of its spring 137, the ink is transmitted to the other rolls 100.

By the above described mechanism the ink is taken up intermittently by ductor roll 106, is spread over roll 109, is taken off by transfer roll 126 and is distributed over the distributer rolls and inking rolls 100.

The invention in its broader aspects is not limited to the forms shown and described but changes may be made therein within the scope of the claims, without departing from the principles of the invention and without sacrificing its chief advantages.

Having thus described my invention, the following is what I claim as new therein, and desire to secure by Letters Patent:

1. A typographic machine including in combination a controller, means for receiving and feeding said controller, fluid pressure means for causing the controller to print the characters of words and to proportion the interval spaces whereby the lines are justified.

2. An automatic typographic apparatus adapted to operate under the control of a controller having character and indenting perforations arranged in transverse lines, said apparatus comprising fluid pressure operated selective means operating under the control of the perforations on a single transverse line to print selectively a plurality of characters and to indent the printed matter.

3. An automatic typographic apparatus adapted to operate under the control of a controller, said apparatus comprising a plurality of type carriers, each carrier carrying a separate case or style, means for selecting any of said carriers, means for selecting a character on the selected carrier, both of said selective means controlled by the controller.

4. An automatic typographic apparatus comprising a plurality of type carriers each carrier bearing a set or face of type of different design from the type of the other carriers, means for selecting type from any one of said carriers, and means for automatically changing the selection from one of said carriers to another.

5. An automatic typographic apparatus having a plurality of type carriers and adapted to operate under the control of a controller, said controller having shifting and character perforations arranged in transverse lines thereof, said apparatus comprising means operating under the control of the perforations on a single transverse line of the controller to select one of the type carriers and bring the same into operative position, and to select characters in each carrier.

6. An automatic typographic apparatus to be controlled by a controller having perforations therein representing typographic characters, normal word spaces, and justification values, said apparatus having selective means coöperating simultaneously with the controller to select the characters, spaces and justification values represented by the perforations therein, and impression, spacing and justifying means operating by fluid pressure under the control of the controller.

7. An automatic typographic apparatus adapted to be controlled by a controller having perforations therein representing typographic characters, normal word spaces, and justification values, said apparatus having selective means coöperating simultaneously with the controller to select the characters, spaces and justification values and to shift from one type face to another, and impressions mean operating by fluid pressure under the control of the controller.

8. In an automatic typographic apparatus, means to receive a controller, said means comprising coöperating clamping members to clamp and hold the controller in operative positions, means to feed the controller, means to release the clamping members during feed movements of the controller, a series of passages for pressure fluid in one of said clamping members and means to supply pressure fluid thereto, said passages controlled by the controller and communicating with mechanisms for controlling the operation of the apparatus, each of those passages which communicate with the character-selecting mechanism representing one or more typographic characters.

9. An automatic typographic apparatus the operation of which is governed by a controller, a series of valves controlled by the controller, connections from said valves to a series of controlling cylinders, a plurality of type carriers, shifting means to bring any one of said carriers to operative position, means controlled by the controlling cylinders to arrest and retain any of the carriers in operative position, and connections from the controlling cylinders to the shifting means.

10. An automatic typographic apparatus the operation of which is governed by a controller, a series of valves controlled by the controller, connections from said valves to a series of controlling mechanism, a plurality of type carriers, a series of shift cylinders having connection with the type carriers to shift any of said carriers to operative position, automatic means to lock the carriers in operative position, means actuated by the controlling cylinders to release said locking means, and connections from the controlling cylinders to the shift cylinders.

11. An automatic typographic apparatus comprising a type carrier, means for receiving and feeding a controller, selecting means coöperating with the controller to release the type carrier and selectively arrest it, and means operated by the movement of the type carrier to control the feeding mechanism for the controller.

12. The combination with a pivotally mounted type carrier and driving means therefor, of a plurality of pneumatically controlled devices adapted to arrest the same in different positions, and selective controlling connections for said pneumatically controlled devices.

13. The combination of a movable type carrier, driving means therefor, a plurality of pneumatic controlling devices adapted to arrest the same in different positions, selective controlling means for said pneumatically controlled devices, and releasing means for the type carrier controlled by said selective controlling means.

14. The combination of a plurality of type carriers, fixed and movable shafts therefor, means for shifting the type carriers to bring any one of them in coöperative relation with the movable shaft, while the others remain on the fixed shaft.

15. In an automatic apparatus for making typographic impressions, a plurality of type carriers, a plurality of corresponding feed-controlling devices having feed mechanism coöperating therewith, and means for shifting the type carriers and feed controlling devices simultaneously to bring a corresponding type carrier and feed controlling device into operation simultaneously, and impression means coöperating with the selected type carrier.

16. In an automatic apparatus for making typographic impressions, the combination of a plurality of type carriers and a corresponding plurality of feed controlling devices, an operating shaft common to said type carriers and feed controlling devices, and means for shifting the type carriers and feed controlling devices simultaneously and correspondingly.

17. The combination of the plurality of type carriers, automatically operated shifting means therefor, and locking means for holding the type carriers in different shifted positions.

18. The combination of the plurality of type carriers, shifting means therefor, selective controlling means for the shifting means and locking means for the type carrier controlled by such selective controlling means.

19. The combination of a type carrier, driving means therefor, selective arresting means for the type carrier, a momentum device connected to the type carrier and adapted to operate on the arrest of the type carrier, and impression means controlled by said momentum device.

20. The combination of a type carrier, driving means therefor, pneumatically operated impression means, a valve controlling the same, and means controlled by the arrest of said type carrier to operate said valve.

21. An automatic typographic apparatus comprising impression mechanism, a toggle connected therewith to operate the same, and reciprocating means for moving the toggle alternately in opposite directions beyond the dead centers to give an impression for each movement of the toggle in either direction.

22. A pneumatically controlled impression means comprising oppositely acting cylinders and valve means for admitting pressure alternately to said pistons.

23. In an automatic typographic apparatus, the combination of a carriage, driving means therefor and feed controlling mechanism connected to said carriage, said controlling mechanism comprising a reciprocating member, impression means, and means controlled at each impression to move the reciprocating member in one direction, and selective justifying means controlling its movement in the reverse direction.

24. In an automatic typographic apparatus, the combination of a carriage, driving means therefor and feed controlling mechanism connected to the carriage and comprising a reciprocating member, impression means and means controlled at each impression to move the reciprocating member in one direction, a type carrier, and a stop device movable therewith and adapted to control the movement of said reciprocating member in the reverse direction.

25. In an automatic typographic apparatus, the combination of a carriage, driving means therefor, feed controlling mechanism connected to the carriage and comprising a reciprocating member, impression means, and means controlled at each impression to move the reciprocating member in one direction, a plurality of type carriers, a plurality of stop devices movable with and corresponding to the type carriers, said stop devices operating to limit the movement of said reciprocating member in a reverse direction, and means for shifting said type carriers and stop devices.

26. In an automatic typographic apparatus, the combination of a carriage, driving means therefor, feed controlling mechanism connected to the carriage and comprising a reciprocating member, impression means, and means controlled at each impression to move the reciprocating member in one direction, selective character-spacing means, and justifying means, each of said means controlling the movement of said reciprocating member in a reverse direction.

27. In an automatic typographic apparatus, the combination of a carriage, driving means therefor, feed controlling mechanism connected to the carriage and comprising a reciprocating member, impression means and means controlled at each impression to move to the reciprocating member in one direction, a type carrier, a stop device movable with the type carrier and controlling the movement of said reciprocating member in reverse direction, said stop device having stop portions corresponding to the spacing for the respective characters and a portion allowing an extra movement of said reciprocating member, and justifying stop devices coöperating with said reciprocating member to control such extra movement.

28. In an automatic typographic apparatus, the combination of a carriage, driving means therefor, feed controlling mechanism connected to the carriage and comprising a reciprocating member, impression means and means controlled at each impression to move this reciprocating member in one direction, and selective justifying means controlling its movement in a reverse direction.

29. In an automatic typographic apparatus, a carriage, a mechanism comprising a fluid-pressure operating means, and valve devices controlled by the movement of the carriage for reversing the movement of the same.

30. The combination of a pneumatic carriage operating device, valve devices therefor, a controller strip means controlling the valve devices to cause the carriage to move in one direction and means controlled by the movement of the carriage to cause the movement in the other direction.

31. In an automatic typographic apparatus, a type carrier, inking rolls coöperating therewith, a distributing and a ductor roll, an ink fountain, and means to convey ink to a ductor roll and means for causing the ductor roll to intermittently engage the distributing roll, substantially as set forth.

32. In an automatic printing apparatus the combination of the plurality of type carriers, shifting means therefor, inking rolls, and means for separating the inking rolls from the type carrier during the shifting operation.

33. In an automatic typographic apparatus, the combination of a type carrier, inking rolls therefor, ink-supplying and distributing devices comprising an ink supplying means, a movable support, a transfer roll supported therein and movable for contact with the ink supplying devices and the inking rolls, and fluid-pressure motive devices for imparting a rotation to the transfer roll when out of contact with the ink supplying means.

34. In a pattern-controlled printing-machine, a pattern-feeding mechanism, printing, inking and impression-taking mechanisms, and a paper-carrying traveling carriage, in combination with fluid pressure operated means controlled by the pattern for automatically stopping the machine at the conclusion of a printed line, means for automatically returning the carriage to initial position and means for automatically moving the paper for the printing of a new line.

35. The combination of a type carrier, means for automatically positioning the same, means for applying the ink to the face of the type and distributing it thereon, with means for taking impressions of the type and means for dividing the impressions taken into words and lines, and means for justifying the lines.

36. In a pattern-controlled printing-machine, a character-printing body movable to position as desired, a pattern-mechanism for controlling the positioning of the body, and inking mechanism, including a roll, operating independently of the pattern-mechanism, said roll moved independently of the character movements, substantially as described.

37. A typographic machine including in combination character bearing means, a movable carriage for the impression receiving material movable for letter and word spacing, a controller controlling the character bearing means and means for controlling the movements of said carriage, both said controlling means coöperating with a single controller.

38. In a typographic machine of the class described, a circular type carrier having detachable types containing a series of single and multiple type faces, means to impart to said carrier an intermittent movement, the maximum number of stops during a complete rotation of the carrier being equal to the number of type faces represented, and automatic means for stopping the type carrier.

39. In a machine of the character described, a type carrier, impression mechanism for taking impressions from the type, said mechanism comprising a platen, a toggle connected with the platen, means connecting said toggle to simultaneously flex the toggle in both directions and means to execute impressions when the toggle passes dead center in each direction.

40. In a typographic machine, employing a plurality of alphabets, a series of type carriers each carrying an alphabet, and each of said carriers being capable of separate operation for positioning characters to be printed while the other carriers are stationary.

41. A typographic machine including in combination a moving type carrier, a controller for positioning said carrier to present types at the impression point in the order of selection, an ink receptacle and means for receiving ink therefrom and applying it to the types of the type carrier so presented.

42. A typographic machine including in combination a moving type carrier, a controller for positioning said carrier to present types at the impression point in the order of selection, an ink receptacle and traveling means for transferring ink therefrom to the face of the types of the type carrier so presented.

43. In a typographic machine of the class described, a type carrier, means for operating the same to automatically compose any given matter, the parts of which have previously been designated by a series of representations, an inking device for the type faces, the same consisting of an ink receptacle, means for feeding the ink from the receptacle to a distributer and means for transferring the ink from the distributer to a series of ink applying devices, and means for applying the distributed ink to the face of the type.

44. In a typographic machine of the character described, a type carrier having a rotary movement, and a series of inking rollers coöperating therewith, an ink retaining receptacle, and a traveling roller alternately coöperating with the receptacle and the ink applying rollers, in such manner as to receive ink from the receptacle and to distribute the same to the rollers by making contact with the same separately but in succession.

45. In a typographic machine of the class described, a type carrier having a rotary movement, a series of ink applying rollers, an ink receptacle, and a traveling transfer and distributing roller that will alternately communicate with the receptacle and the ink applying rollers, the traveling rollers being so mounted, as to contact with the ink applying rollers singly, the mount for the ink applying roller being so equipped as to withdraw each ink applying roller from the face of the type while supplying it with ink, and distributing the same thereon.

46. In a typographic machine of the character described a circular type carrier, ink rollers normally in contact therewith, and an arm journaled to swing from the central support of said carrier, said arm being provided at its free end with a roller adapted to make contact with the rollers engaging the carrier, and automatic means to impart to said roller a vibratory movement.

47. In an automatic typographic machine, an arm journaled upon the central bearing of a circular type carrier, said arm being provided with an inking roller and automatic means to vibrate said arm.

48. In an automatic typographic machine an arm journaled centrally of a circular type carrier, said arm being provided near its free end with an inking roller, means to impart to said roller a rotary movement, and automatic means to impart to said arm a vibratory movement.

49. In a typographic machine of the class described, a series of circular type carriers, a series of inking rollers normally in contact with one of said carriers, means for removing the rollers from contact with the carrier, means for removing the carrier and bringing another of the series into position to be inked by said rollers, and means for bringing the rollers into contact with said last mentioned carrier.

50. In a machine of the character described, a type carrier, a series of ink-applying rolls, means to hold said rolls normally in contact with the type, a distributer roll, means to raise each of the applying rolls *seriatim* off the type, and into contact with the distributer roll, an ink font and a ductor roll for transferring ink from the font to the distributer roll.

51. In a machine of the character described, a type carrier, a series of ink applying rolls, means to hold said rolls normally in contact with the type, a distributer roll and means to bring said distributer roll adjacent each of the applying rolls *seriatim*, means for lifting each applying roll from the type and into contact with the distributer roll, as the latter passes adjacent thereto, and means to apply and distribute ink upon said distributer roll.

52. In a machine of the character described, a type carrier, a series of ink applying rolls normally in contact with the type, a swinging arm, a distributer roll mounted on said arm, means to swing the arm to bring the distributer roll adjacent each of the applying rolls *seriatim*, means carried by said arm for lifting each applying roll from the type into contact with the distributer roll, as the latter passes adjacent thereto, an ink font and means for transferring ink from the font to the distributer roll.

53. In a machine of the character described, a type carrier, automatically operated means to position type in printing position, said type-carrier having also non-printing positions, a plurality of ink applying rolls normally in contact with the type, and automatically operated means for lifting all of said ink-applying rolls simultaneously from the type when the type carrier is in non-printing position.

54. In a machine of the character described a plurality of type-carriers, selectively operated means to position any one of said carriers in operative position, a series of ink applying rolls normally in contact with the type carrier in operative position and automatically operated means to raise said ink applying rolls from the carrier when another carrier is moved into operative position.

55. In a machine of the character described, a plurality of type-carriers, selectively operated means for shifting any one of said carriers into operative position, a series of independently mounted ink applying rolls normally in contact with the type carrier in operative position, means to lift said ink applying rolls simultaneously from the carrier when another carrier is shifted into operative position.

56. A typographic machine including in combination a type carrier, means for carrying an impression-receiving material, means for automatically positioning the type carrier, a plurality of rolls for inking the type carrier, means for applying ink to said rolls, and means for bringing the type carrier and the impression receiving material into impression contact.

57. A typographic machine including in combination, impression means comprising a plurality of type carriers, means for inking the type carriers, means for carrying the impression receiving material, means for automatically shifting the type carriers, and means for bringing one of said type carriers and the impression receiving material into impression contact.

58. In a typographic machine, inking mechanism comprising ink distributing means, ink conveying means, and character impressing means traveling in one direction coöperating therewith to receive ink and to impress characters.

59. A typographic machine having inking means, and character impressing means normally traveling but which are successively positioned between character impressions and which are inked by said inking means.

60. A typographic machine having character impressing means rotating in one direction, reciprocating inking means and reciprocating impression receiving means.

61. A typographic machine including in combination a rotatable type carrier arrestable in a plurality of printing positions, fluid pressure actuated means for so arresting the carrier, a controller, and means coöperating with the controller to control the fluid pressure means.

62. A typographic machine including in combination a rotatable type carrier, a plurality of devices circularly arranged and fluid pressure operated, for controlling the type carrier, and a controller for controlling the action of the fluid pressure upon said devices.

63. A typographic machine including in combination a rotatable type carrier, a plurality of devices circularly arranged and fluid pressure operated, for controlling the type carrier, a controller, and devices arranged in a right line and co-acting with said controller.

GEO. R. CORNWALL.

Witnesses:
CECIL H. MOORE,
ARTHUR P. KNIGHT.